March 10, 1953  M. V. KIEBERT, JR  2,631,278
FREQUENCY MODULATED RADIO RANGING APPARATUS
Filed May 31, 1945  2 SHEETS—SHEET 2

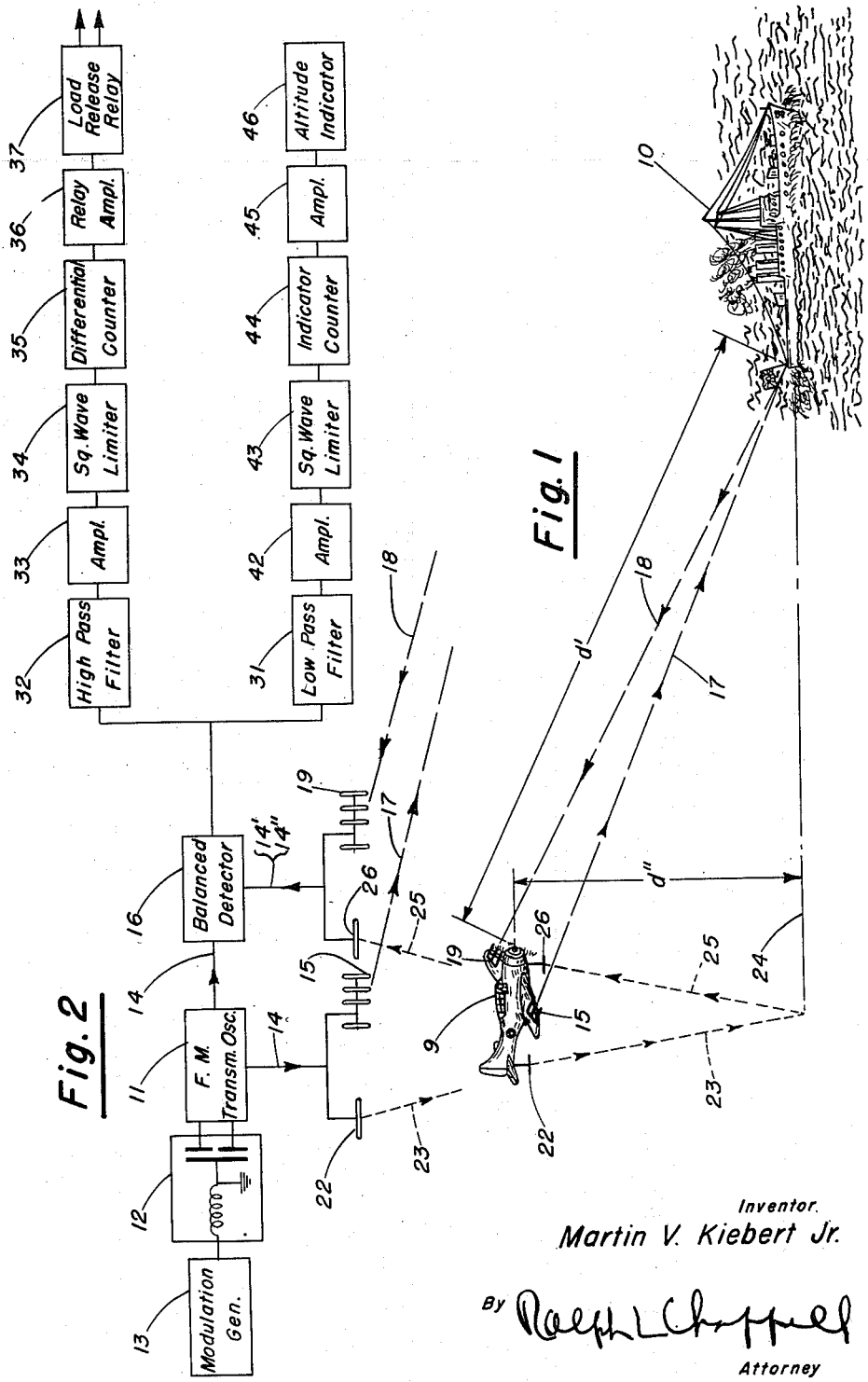

Inventor
Martin V. Kiebert Jr.
Attorney

Patented Mar. 10, 1953

2,631,278

UNITED STATES PATENT OFFICE 2,631,278

FREQUENCY MODULATED RADIO RANGING APPARATUS

Martin V. Kiebert, Jr., United States Navy

Application May 31, 1945, Serial No. 596,935

2 Claims. (Cl. 343—14)

(Granted under Title 35, U. S. Code (1952), sec. 266)

This invention relates in general to automatic load release apparatus of the frequency modulated radio computer type for use on relatively low flying aircraft, such as for example, in bombing isolated or semi-isolated surface targets.

The general object of the invention is to improve the present apparatus of the class described by reducing the number of component parts necessary for satisfactory operation.

In order that a bomb or other load will be certain to strike the target when released from a low flying aircraft, the radio computer must solve a problem in which the following factors must be determined and evaluated:

1. Height of the plane (or bomb) above sea level or ground;
2. Horizontal distance from plane to target (range); and
3. Relative horizontal speed between plane and target (range rate).

The equation which has been derived for solving the problem is:

$$D^2 - S\left(\frac{\sqrt{A}}{4.01} + T\right)D - A^2 = 0 \qquad (1)$$

where:

$D$=proper dropping distance in feet measured on the direct slant path.
$S$=relative speed in feet per second, measured on the direct slant path.
$A$=altitude in feet.
$T$=total time delay (inherent delay in response of system components).

$\dfrac{\sqrt{A}}{4.01}$=time of free space fall in seconds.

From the above equation, it is evident that the dropping distance D will be different for different altitudes A, the relation being that as the altitude A is increased, the dropping distance D also is increased. Accordingly, the computer apparatus has to be adjusted by the pilot for the particular altitude at which he is flying, and the pilot must maintain a strictly level flight at the selected altitude if the bombing is to be accurate.

Ordinary barometric pressure types of altimeters are not accurate enough to determine the altitude of the plane with the exactness required, and hence use is made of the frequency modulated radio type of altimeter in which the altitude is determined by the well known technique of sending a frequency modulated radio wave from the plane to the ground or sea surface, receiving the reflected wave, heterodyning the instantaneous reflected and transmitted waves to produce a beat frequency wave, and calibrating an altimeter scale in accordance with the increase in frequency of the beat frequency wave as the altitude increases.

Consequently, it is the present practice to include one complete frequency modulated radio ranging apparatus for determining the altitude and another such complete apparatus which ranges on the target to be bombed and computes the time of release of the bomb or other load.

As previously stated, it is the general object of this invention to combine certain operating components of the two kinds of equipment to the end that the total number of components necessary to a complete apparatus of the class described is materially reduced. The advantages of this should be obvious, since it reduces not only the cost, but what is more important, it also reduces the weight which is a most important factor in aircraft operation.

A specific object is to provide an improved frequency modulated radio ranging apparatus of the class described wherein both altitude and such other information as is necessary to feed into the load release computer may be obtained from the same components of the apparatus.

A more specific object is to provide an improved apparatus of the class described in which the same frequency modulated transmitter and detector components can be used for both the altitude indicating apparatus and the automatic load release computer apparatus.

A still more specific object is to provide an improved apparatus of the type referred to above wherein a high-pass filter is connected in the output of the detector component to establish a first branch circuit that is used to feed the automatic load release computer apparatus, and a low-pass filter is similarly connected to establish a second branch circuit that is used to feed the altitude indicating apparatus.

Yet another specific object is to separate by means of high and low pass filters, respectively, the beat frequency band attributable to ground reflection of the FM wave from the band attributable to target reflection of the wave. These filters are connected to the output of the FM detector stage to the end that common FM transmitter and detector units may serve the dual function of supplying information pertinent to altitude determination and also information needed by the automatic load release computer apparatus.

In the drawings which represent a preferred embodiment of the invention

Fig. 1 is a diagram showing the distance relation between (1) the aircraft and the earth's surface (land or sea) immediately below it, and (2) the aircraft and target;

Fig. 2 is a block diagram of the apparatus;

Figure 3:
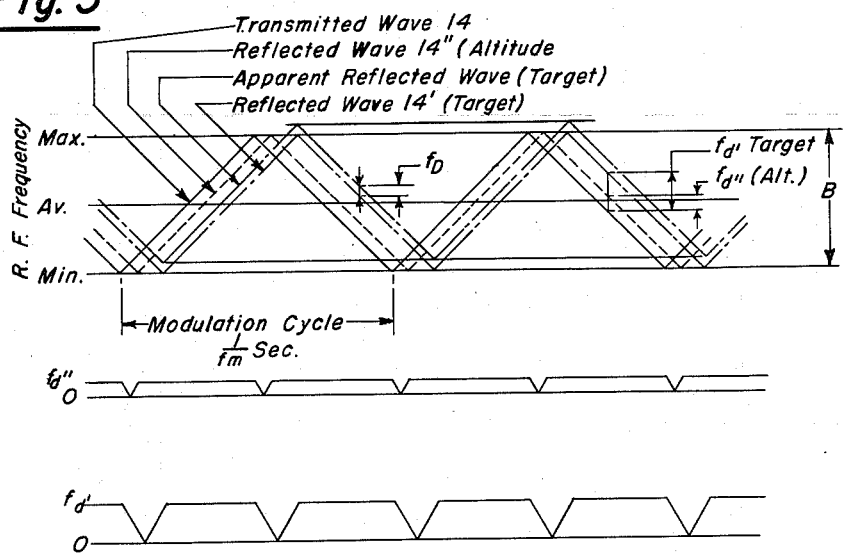
Fig. 3 is a graph showing the relationship between the transmitted FM radio wave and the two reflected waves.

Referring to Fig. 1, an aircraft 9 is shown flying in level flight at a relatively low altitude towards a target 10. With reference also now to Figs. 2 and 3, there is provided on the aircraft 9 a frequency modulated radio ranging apparatus. The latter includes a transmitter oscillator 11 which generates a continuous high frequency carrier wave. This wave is frequency modulated cyclically between lower and upper limits over a frequency band B by means of a modulator device 12 which is fed by the output of a modulation generator 13. The frequency modulation imposed upon the carrier wave may have either a linear, i. e. "sawtooth" characteristic, or it may be substantially sinusoidal. However, in the present embodiment, it is assumed to be linear.

The frequency modulated output wave 14 from the transmitter oscillator 11 is branched to feed a "Yagi" type antenna 15, and is also simultaneously injected directly into a balanced detector 16. Antenna 15 beams the radio wave 14 ahead and sufficiently downwardly along path 17 to strike the target 10. The target reflected wave 14' returning along path 18 is received back at aircraft 9 on another "Yagi" antenna 19 and also fed into detector 16.

The frequency modulated output wave 14 in addition to feeding antenna 15 and being injected into detector 16 is also branched to feed a half wave dipole antenna 22 carried by aircraft 9. The frequency modulated wave 14 radiated therefrom is beamed substantially vertically downward along path 23 to the earth's sea surface 24. The surface reflected wave 14'' returns along path 25 to the aircraft being received on antenna 26, which is also a half wave dipole, and then fed into detector 16 simultaneously with the target reflected wave 14'.

Referring now to Fig. 3, the instantaneous frequency of the reflected wave 14' lags the instantaneous frequency of the transmitted wave 14 by $$\frac{2d'}{C}$$

where $d'$ is the distance in feet from the aircraft 9 to target 10, and C is the speed in feet per second of the wave. Since a portion of the transmitted wave 14 is injected directly into detector 16, the transmitted wave 14 and target reflected wave 14' will heterodyne in the detector to produce the difference frequency wave $f_d'$.

If one assumes a condition of zero relative motion between aircraft 9 and target 10, i. e., the distance between them remains fixed, then the frequency $f_d'$ of the beat frequency wave due to the target reflected wave is determined by the equation:

$$f_d' = 2f_m B \times 10^6 \left(\frac{2d'}{C}\right) \text{ cycles per second} \quad (2)$$

where $f_m$ = modulator sweep frequency, in cycles per second.
$B$ = bandwidth, in megacycles.
$d'$ = distance from aircraft to target, in feet.
$C$ = velocity of wave propagation = $984 \times 10^6$ feet per second.

Similarly, the frequency $f_d''$ of the beat frequency wave due to the surface reflected wave 14'' will be determined by Equation 2.

Referring back to Equation 1, it is evident that the dropping distance D increases as the relative speed S increases, and likewise increases with an increase in bombing altitude. Thus, since D varies as a function of both relative speed and altitude, it is obvious that by selecting a relatively high bombing speed and a relatively low altitude, the bomb or other load will be released at a time when the distance from the aircraft 9 to target 10 is considerably greater than its altitude. For example, with the aircraft in level flight at an altitude of 50 feet and flying at a speed of 350 feet per second, the dropping distance D as calculated from Equation 1, with T equal to .36 second, would be 750 feet. At an altitude of 300 feet, D would amount to 1700 feet. With the foregoing as a premise, and remembering from Equation 2 that the frequency of the beat frequency wave is proportional to distance, it will be evident that the frequency of the beat frequency wave attributable to that part of wave 14 radiated from antenna 15 towards the target will always be high as compared to the frequency of the beat frequency wave attributable to that part of the wave 14 radiated from antenna 22 directly downward towards the sea or land surface.

The foregoing relation between the frequencies of the beat frequency signals due to target and surface reflections, respectively, was established on the assumption of a zero relative speed between the aircraft 9 and target 10. Actually, however, since the aircraft 9 is moving towards the target 10, the beat frequency output from the detector 16 attributable to the target reflected wave, will, because of the Doppler effect, contain two frequencies. Referring to Fig. 3, one of these frequencies occurs during the up-sweep of the frequency modulated wave 14 and is equal to $f_d' - f_D$ where $f_d'$ is the beat frequency and $f_D$ is the frequency component due to the Doppler effect. The other occurs during the down-sweep of the frequency modulated wave 14 and is equal to $f_d' + f_D$. Each of the two frequencies carry both distance and speed information, and each will still be high as compared to the beat frequency wave attributable to the surface reflected wave.

Figure 4:
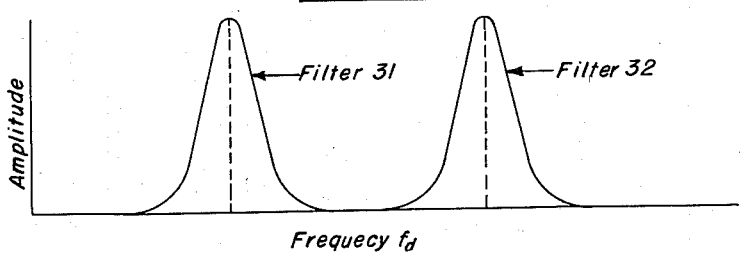
Fig. 4 is a graph showing the relation between the high and low band-pass filters utilized in the apparatus.

For separating out the beat frequency wave attributable to the surface reflected wave from the two frequencies attributable to the target refleced wave, I provide low and high pass filters, 31 and 32, respectively. The relative band-pass characteristics are shown in Fig. 4. The output from detector 16 representing the two frequencies carrying target distance and speed information is taken through the high pass filter 32 into a multi-stage amplifier unit 33. The output from amplifier 33 is put through a limiter stage 34 which acts to convert the output from the amplifier into square waves. These signals are then applied to a differential counter circuit 35 which develops a positive voltage proportional to measured target distance and a negative voltage proportional to measured relative speed between aircraft 9 and target 10. The vector sum of these two voltages (actually, the arithmetical difference) is fed to amplifier 36. When the resultant voltage represents the solution to Equation 1, a load release relay 37 is actuated and the bomb or other load is dropped from the aircraft 9 by means of a suitable mechanical release mechanism controlled by the circuit through the contacts of relay 37. The operating components described, excluding filter 32, are conventional and hence have only been shown in block form. For a more detailed description of the apparatus which computes the time of load release, reference is made to my co-pending application, Serial No. 573,617, filed January 19, 1945, now U. S. Patent 2,490,816, dated December 13, 1949.

The output from detector 16 representing the beat frequency which carries altitude information is taken through low pass filter 31 into a multi-stage amplifier unit 42 and the output of the latter is applied to a square wave limiter 43. The function of limiter 43 is to convert the output of amplifier 42 into substantially a square wave input signal to indicator counter 44. The latter develops a positive D. C. voltage which is approximately proportional to the frequency of the square wave limiter signal. The output from counter 44 is then fed to an indicator amplifier stage 45, the function of which is to supply a current, proportional to the output from counter 44, to an altitude indicator meter 46. The latter may be calibrated in feet of altitude since it has already been shown from the previously included Equation 2 that altitude is proportional to the beat frequency different $f_d''$ between the frequency of the transmitted wave 14 and the frequency of the surface reflected wave 14'' at any instant. The operating components pertaining to altitude indication per se are also of conventional design and hence have been illustrated in block form only.

It was stated in the opening part of this specification that the object of this invention is to provide an arrangement whereby certain components of the altitude determining apparatus and the apparatus which computes the time for the load release are each common to the other. Thus, from what has been described, it should now be evident that by using the high and low pass filters 31 and 32 and selecting the proper relation between aircraft speed and altitude, as explained, the same transmitter oscillator 11, its frequency modulator 12, the modulation generator 13, and the balanced detector 16 serve a dual function. This is obviously a decided advantage over presently designed equipment where one complete FM ranging apparatus including transmitter and receiver apparatus is required to furnish altitude information, and another such complete equipment is required to supply distance and speed information to the load release computing device.

In conclusion, it is to be understood that while the embodiment of the invention which has been described is to be preferred, changes may be made in the construction and arrangement of parts without departing from the spirit and scope of the appended claims.

The invention described herein may be manufactured and used by or for the Government of the United States of America for governmental purposes without the payment of any royalties thereon or therefor.

What is claimed is:

1. In an automatic load release system for aircraft, means for producing a frequency modulated wave, transmitting means including a first portion for radiating a wave toward a target which is moving relative to the aircraft and a second portion for radiating a wave substantially vertically downward toward the earth's surface, means for receiving the target and surface reflected waves, means for combining the reflected waves and the transmitted wave to produce beat frequency signals, a first filter connected to the combining means for passing only the beat frequency signal attributable to the target reflected wave, a second filter for passing only the beat frequency signal attributable to the surface reflected wave, and a differential counter connected to the first filter for compensating for Doppler effect on the target reflected wave.

2. In an automatic load release system for aircraft, means for producing a frequency modulated wave, means for transmitting said wave toward a target which is moving relative to the aircraft and for also transmitting said wave substantially vertically downward toward the earth's surface, means for receiving and combining the target and surface reflected waves with the transmitted waves to produce beat frequency signals, filter means connected to the output of the combining means for separating the beat frequency signal attributable to the target reflected wave from the beat frequency signal attributable to the surface reflected wave, and a differential counter connected to the filter means for compensating for Doppler effect on the beat frequency signal attributable to the target reflected wave.

MARTIN V. KIEBERT, JR.

REFERENCES CITED

The following references are of record in the file of this patent:

UNITED STATES PATENTS

| Number | Name | Date |
|---|---|---|
| 2,301,929 | Budebom | Nov. 17, 1942 |
| 2,412,003 | Neufeld | Dec. 3, 1946 |
| 2,412,632 | Sanders et al. | Dec. 17, 1946 |
| 2,604,621 | Earp et al. | July 22, 1952 |

FOREIGN PATENTS

| Number | Country | Date |
|---|---|---|
| 522,890 | Great Britain | July 1, 1940 |